United States Patent [19]
Michel

[11] 4,409,277
[45] Oct. 11, 1983

[54] VISUAL INFORMATION CARRIER COMPRISING A FLEXIBLE PLASTIC SHEET

[75] Inventor: Wolfgang Michel, Wiesbaden, Fed. Rep. of Germany

[73] Assignee: Hoechst Aktiengesellschaft, Frankfurt am Main, Federal Rep. of Germany

[21] Appl. No.: 319,293

[22] Filed: Nov. 9, 1981

[30] Foreign Application Priority Data

Nov. 29, 1980 [DE] Fed. Rep. of Germany ... 8031841[U]

[51] Int. Cl.$^3$ ........................ B32B 3/30; G01D 15/34
[52] U.S. Cl. ...................................... 428/156; 40/616; 156/67; 273/DIG. 24; 264/1.1; 264/2.7; 264/21; 264/293; 346/77 R; 346/77 E; 346/134; 346/135.1; 428/187; 428/338; 428/339; 428/480; 428/522; 428/523; 428/690

[58] Field of Search ............................ 156/67; 40/616; 273/DIG. 24; 264/1.1, 1.7, 2.7, 21, 78, 293; 346/77 R, 77 E, 134, 135.1, 136; 427/157; 428/156, 195, 207, 480, 522, 523, 913, 174, 187, 332, 337–339, 690

[56] References Cited

U.S. PATENT DOCUMENTS

| | | | |
|---|---|---|---|
| 3,210,466 | 10/1965 | Day | 346/77 E |
| 3,542,630 | 11/1970 | Pfiffner | 428/913 |
| 3,887,734 | 6/1975 | Chazan | 428/913 |
| 4,276,334 | 6/1981 | Sugihara | 428/913 |
| 4,341,833 | 7/1982 | Schäfer | 428/480 |

*Primary Examiner*—Bruce H. Hess
*Attorney, Agent, or Firm*—Schwartz, Jeffery, Schwaab, Mack, Blumenthal & Koch

[57] ABSTRACT

A visual information carrier comprising a single layer sheet of transparent synthetic polymer having dispersed therein a fluorescent dye. The sheet is not subject to white fracture and has profilings on at least one surface, which are produced by deformation of the sheet and which form visually perceivable, colored information.

17 Claims, 2 Drawing Figures

VISUAL INFORMATION CARRIER COMPRISING A FLEXIBLE PLASTIC SHEET

BACKGROUND OF THE INVENTION

The present invention relates to a visual information carrier in the form of a flexible transparent synthetic polymer sheet which is free from white fracture and has a structured surface on which the structured surface zones represent colored, visually perceivable information.

Flexible visual information carriers comprising embossed sheets of polymeric materials are known in which the embossed zones differ in color from the background and represent visually perceivable information. This known visual information carrier in the form of a sheet is constructed of two layers and is therefore expensive to manufacture.

The information carrier comprises a translucent, colorless, undyed carrier sheet, for example of 200 μm thickness, with latent white fracture and composed of unplasticized polyvinyl chloride. White fracture occurs in the sheet when it is folded or embossed at room temperature, the sheet becoming irreversibly opaque in the zone of the folding or embossing.

On one surface of the carrier sheet, there is an elastic, opaque, colored lacquer coating having a thickness of, for example, 5 to 20 μm. The colored opaque lacquer coating on one surface of the translucent colorless carrier sheet forms the back of the information carrier.

On the surface of the carrier sheet of the information carrier which faces away from the lacquer layer and which forms the viewing side of the information carrier, projections protrude from the laminate comprising the carrier sheet and the lacquer layer. The projections are formed by embossing the laminate sheet at room temperature. Due to white fracture, the projections are opaquely white. The white projections stand out as visually perceivable information from the unembossed zone of the laminate comprising the carrier sheet and the lacquer layer.

Due to the colored opaque lacquer coating on the back of the carrier sheet, the entire information carrier is opaque. The known information carriers also have the further disadvantage that the information is formed only by white embossing.

SUMMARY OF THE INVENTION

It is the object of the present invention to provide a new carrier sheet for visual information.

A further object of the present invention is to provide a visual information carrier sheet which is transparent.

Another object of the present invention is to provide a visual information carrier sheet wherein the visual information appears in the form of a colored image.

An additional object of the invention is to provide a visual information carrier sheet comprising a single layer of material.

It is also an object of the present invention to provide a visual information carrier sheet which can be more easily and inexpensively manufactured.

These and other objects of the invention are achieved by providing a visual information carrier comprising a single-layer, flexible, transparent, synthetic polymer sheet having a fluorescent dye dispersed therein; said sheet being free from white fracture and having on at least one surface thereof a transparent profiled structure produced by deformation of the sheet; said profiled structure presenting a contrasting visual appearance in comparison to unprofiled regions of said sheet.

The sheet can be composed of any synthetic polymer material from which clear transparent sheets, which are free from white fracture, can be manufactured.

The transparent sheet does not have any latent white fracture; it is free from white fracture. The term "free from white fracture" is intended to mean that, when the sheet is folded or embossed at room temperature, no white fracture occurs in the folding or embossing zones, which would irreversibly cause the sheet to become opaquely white in such zones.

Particularly suitable sheets are composed of polyvinyl chloride produced by suspension polymerization from which glass-clear sheets can be manufactured. Sheets of polyester (e.g., polyethylene terephthalate) or polypropylene are also suitable.

The transparent sheet free from white fracture has a thickness of preferably about 150 to about 1,500 μm. A fluorescent dye is homogeneously distributed throughout the transparent sheet free from white fracture. The fluorescent dye comprises from about 0.002 to 1.0% by weight, preferably about 0.02% by weight, relative to the total weight of the information carrier sheet.

Particularly suitable fluorescent dyes include one or more of the following: anthraceno [2,1-m; 1,9 a-n, 9a, 9-a]thioxanthene, Cu-phthalocyanine (Color Index No. 74,160) and N-(n-octadecyl)-benzo[k,1]thioxanthene-3,4-dicarboximide. The chemical molecules of the fluorescent dye are referred to hereinafter as fluorescence centers.

With respect to the structural design of the information carrier of the invention, the term "profilings" is to be understood as including transparent sheet projections, which protrude from the sheet and which are formed in the sheet by partial deformation thereof by means of embossing under conditions which prevent removal of any of the material forming the sheet. Mutually opposite, complementary sheet recesses which correspond to the projections may be formed on the other side of the sheet. The term "profilings" also includes notches which are free from white fracture and which are formed in the sheet by displacement of material without cutting pieces of material out of the sheet.

The embossing or notching of the sheet may be effected at room temperature. Alternately, it can be carried out in such a way that the element which embosses or notches the sheet is heated to a temperature which is sufficiently high for thermoforming of the sheet and the sheet is then embossed with this element. The sheet may also be converted by the action of heat into a thermoformable state, then partially hot-formed by embossing or notching by means of the indicated elements and thereafter cooled.

Within the scope of the present application the term "transparent sheet profilings" has the same technical meaning as the term "sheet profilings free from white fracture". Accordingly, the transparent profilings do not differ with respect to their transparency from the particular adjoining notch-free or embossing-free zones of the transparent sheet free from white fracture.

The projections may have a conical form or be ridge-shaped. Preferably, the projections are formed in such a way that they have two or more side walls which preferably are virtually free from curvature. The side walls preferably meet each other in each case at an angle of about 70° to form an edge. In particular, the projections may advantageously be ridge-shaped and considerably longer than they are wide and have triangular cross-sectional areas. The side walls of the projections preferably are virtually free from curvature and meet one another in the region of a preferably straight edge to form an angle of about 60° to 80°, advantageously about 70°.

In a further advantageous embodiment, the projections are shaped like pyramids with side walls which preferably are virtually free from curvature. The projections can also be formed in such a way that they are at least partially open at the top.

The notches are preferably formed into the sheet in such a way that they have two or more side walls which preferably are virtually free from curvature and which meet one another in each case in a region of desirably straight edges at an angle of about 60° to 80°, advantageously about 70°.

Advantageously, the notches are shaped in such a way that their cross-sectional area is triangular. The side walls of the notches preferably are virtually free from curvature. The side walls meet one another and form an angle of about 60° to 80°, advantageously about 70°. Preferably, the side walls define a straight edge.

In a further preferred embodiment, the notches have four side walls which preferably are virtually free from curvature and which each have the same triangular form and the same dimensions. The triangular side surfaces meet each other with the formations of angles of about 60° to 80°, advantageously about 70° in each case in the zone of preferably straight edges.

The side walls of projections or of notches are considered virtually free from curvature, if a straight section has virtually no convex or concave curvature.

In the region of the sheet notches, the information carrier is thinner than in the unprofiled regions of the sheet surrounding the notches.

The information carrier sheet of the invention may be constructed in such a way that the sheet has projections and/or notches on one surface, or also in such a way that it has projections and/or notches on both surfaces.

The profilings of the sheet in the form of projections or notches can have a different form in each case and different dimensions in each case, for example, they can have a straight or curved shape.

The profilings can represent individual items of information. Alternatively, the profilings can also comprise a plurality of discrete projections and/or notches, the mutual arrangement of which is such that together they form numbers, letters or ornamental shapes.

Under the influence of daylight on the sheet, the profilings radiate fluorescent light. Due to the emitted fluorescent light, the profilings of the sheet stand out in color from the non-profiled part of the transparent colored sheet as information which can clearly be perceived by the human eye.

The wavelength distribution of the fluorescent light emitted by the profiled sheet zones corresponds to that of the fluorescent light emitted by the particular fluorescence centers in the sheet. The fluorescence centers absorb light of a defined wavelength and transforms it into fluorescent light having longer wavelengths. The longer wavelength light is then emitted by the fluorescence centers.

Depending on the chemical structure of the fluorescent dye homogeneously distributed in the sheet, the fluorescent light emitted by the sheet exposed to daylight thereon may have different colors. For example, the emitted light can be red, yellow or green.

BRIEF DESCRIPTION OF THE DRAWINGS

The invention will be further described with reference to the accompanying drawings wherein.

DETAILED DESCRIPTION OF PREFERRED EMBODIMENTS

Figure 1:
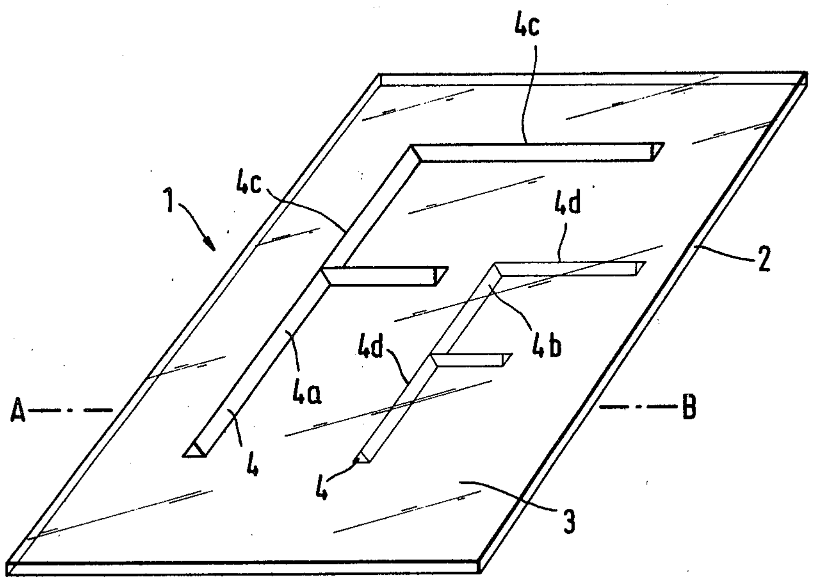
FIG. 1 is a perspective representation of the information carrier of the invention.

FIG. 1 of the drawing shows, in a diagrammatic and perspective representation, a piece of a visual information carrier sheet according to the invention. Ridge-shaped projections protrude from the surface of the sheet facing the observer. The opposite surface of the sheet is provided with notches. In each case, the projections and the notches, as a whole, form the letter F.

In FIG. 1, reference numeral 1 identifies the information carrier as a whole. The transparent sheet containing a fluorescent dye is designated by reference numeral 2. Reference numeral 3 marks unprofiled regions of the sheet, and reference numeral 4 marks sheet zones having a profiled shape. The symbols **4*a* identify ridge-shaped projections of triangular cross-section which rise upwards from one surface of the sheet. The symbols 4*b* designate groove-like notches of triangular cross-section on the other side of the sheet. The symbols 4*c* refer to edges of the projections which form the backbones of the projections. At edge 4*c* the walls of the projection, which are virtually free from curvature, meet one another at an angle of about 70°. The symbols 4*d* refer to the edges of the notch, which form the bottom of the notch. At edge 4*d*** the walls of the notch, which are virtually free from curvature, meet one another at an angle of about 70°.

Figure 2:
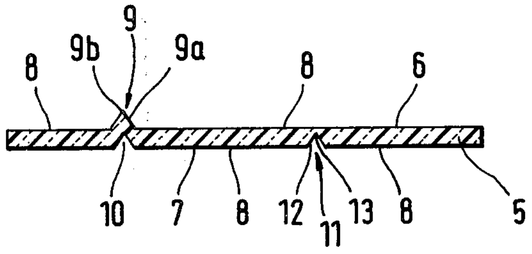
FIG. 2 is a transverse sectional view of the information carrier of FIG. 1 taken along the line A-B.

Referring now to FIG. 2, reference numeral 5 identifies the information carrier. Reference numeral 6 marks the upper side thereof, and reference numeral 7 marks the underside thereof. Reference numeral 8 designates unprofiled regions of the sheet and reference numeral 9 marks a projection protruding from the upper side of the sheet. Projection 9 has a side wall **9*a*, which is virtually free from curvature, and a projection edge 9*b* which forms the backbone of the projection. Reference numeral 10 identifies a recess in the sheet, corresponding to the projection 9, on the underside of the sheet. Reference numeral 11 identifies a notch with a notch side wall 12 which is virtually free from curvature and a notch edge 13 which forms the bottom of the notch. At edge 13 the side walls 12** of the notch meet one another at an angle of about 70°.

The following examples describe several illustrative alternative embodiments of the visual information carrier sheet of the invention.

EXAMPLE 1

Sheet with pyramidal or conical projections

The starting material is a transparent plastic sheet of polyvinyl chloride free from white fracture having a thickness of 150 μm and containing anthraceno [2,1-m; 1,9 a-n, 9a, 9-a]thioxanthene in an amount of 0.02% by weight, relative to the total weight of the sheet. Pyramidal projections are formed into the sheet with the aid of a known embossing device, such as a pair of embossing tongs having an embossing element of pyramidal shape and an abutment having a shape complementary thereto. In similar fashion, conical projections can be formed into the sheet using embossing tongs having an embossing element with a conical shape. The forming of the projections by embossing of the sheet is carried out under such conditions that none of the sheet material is removed during this step.

EXAMPLE 2

Sheet with ridge-shaped projections

The starting material is a sheet according to Example 1. The sheet is embossed by means of embossing tongs, the embossing elements of which are designed in such a way that the projection, embossed into the sheet with the aid of the embossing tongs, has a triangular cross-sectional area and is substantially longer than it is wide. The side walls of the straight, ridge-shaped projection are virtually free from curvature and meet one another at an angle of about 70° in a straight edge which forms the vertex of the ridge. The forming of the elongated ridge-shaped projection into the sheet is carried out under conditions under which none of the sheet material is removed.

EXAMPLE 3

Sheet with notches

The starting material is a sheet corresponding to Example 1. The sheet is placed on a flat solid base as a support and, with the aid of a straight embossing die having a ridge-shaped embossing element with a triangular cross-section, a notch is then formed in the underside of the sheet, facing away from the solid base, by pressing the die onto the surface of the sheet. The notch has a triangular cross-section, and its straight side walls are free from curvature, and meet one another at an angle of about 70° to form a straight notch edge which constitutes the bottom of the notch. Notching of the sheet is carried out under the stated conditions, without cutting any pieces out of the sheet.

When sheets profiled according to any of the Examples are exposed to daylight, the projections or notches stand out luminously, in color, due to fluorescent light which emerges from the sheet in the zones of the projections or notches.

The invention is suitable, for example, for the manufacture of rulers, protractors, so-called embossing tapes, file covers and document folders.

The foregoing description and examples have been set forth merely for purposes of illustration and are not intended to be limiting. Since modifications of the disclosed embodiments incorporating the spirit and substance of the invention may occur to persons skilled in the art, the scope of the invention is to be limited solely with respect to the appended claims and equivalents.

I claim:

1. A visual information carrier comprising a single-layer, flexible, transparent, synthetic polymer sheet having a fluorescent dye dispersed therein; said sheet being free from white fracture and having on at least one surface thereof a transparent profiled structure produced by deformation of the sheet; said profiled structure presenting a contrasting visual appearance in comparison to unprofiled regions of said sheet.

2. An information carrier according to claim 1, wherein said sheet comprises said fluorescent dye in an amount ranging from about 0.002 to 1.0% by weight relative to the total weight of the sheet.

3. An information carrier according to claim 1, wherein said sheet comprises about 0.02% by weight fluorescent dye relative to the total weight of the sheet.

4. An information carrier according to claim 1, wherein said sheet comprises a synthetic polymer selected from the group consisting of polyvinyl chloride, polyester and polypropylene.

5. An information carrier according to claim 4, wherein said sheet comprises polyvinyl chloride produced by suspension polymerization.

6. An information carrier according to claim 1, wherein the fluorescent dye is selected from the group consisting of anthraceno[2,1-m; 1,9 a-n, 9a, 9-a]thioxanthene, Cu-phthalocyanine (Color Index No. 74,160) and N-(n-octadecyl)-benzo[k,l]thioxanthene-3,4-dicarboximide.

7. An information carrier according to claim 1, wherein said profiled structure is formed on only one side of the sheet.

8. An information carrier according to claim 1, wherein said profiled structure is formed on both sides of the sheet.

9. An information carrier according to claim 1, wherein said profiled structure comprises an elongated ridge-shaped projection projecting from the top of said sheet.

10. An information carrier according to claim 9, wherein said ridge-shaped projection has a triangular cross-section with a vertex angle of about 60° to 80°.

11. An information carrier according to claim 9, wherein said ridge-shaped projection has a triangular cross-section with a vertex angle of about 70°.

12. An information carrier according to claim 1, wherein said profiled structure comprises a notch formed in the bottom of said sheet.

13. An information carrier according to claim 12, wherein said notch has a triangular cross-section with a vertex angle of about 60° to 80°.

14. An information carrier according to claim 12, wherein said notch has a triangular cross-section with a vertex angle of about 70°.

15. An information carrier according to claim 1, wherein said sheet has a thickness lying in the range from about 150 $\mu m$ to about 1,500 $\mu m$.

16. An information carrier according to claim 1, wherein a plurality of discrete profiled structures are arranged to form an individual item of information.

17. An information carrier according to claim 1, wherein said profiled structure comprises side walls, said side walls being virtually curvature-free.

* * * * *